Aug. 22, 1967    J. L. JAMIESON ETAL    3,337,434
METHOD OF ELECTROLYTIC ETCHING METALS USING A GEL ELECTROLYTE
Filed Jan. 15, 1964

JAMIE L. JAMIESON
WILLIAM H. HYTER
JAMES R. CADY
RAWLEY D. LARSON
INVENTORS

BY *Max Gulden*

ATTORNEY

United States Patent Office 3,337,434
Patented Aug. 22, 1967

3,337,434
METHOD OF ELECTROLYTIC ETCHING METALS USING A GEL ELECTROLYTE
Jamie L. Jamieson, Lynwood, William H. Hyter, Los Angeles, James R. Cady, Beverly Hills, and Rawley D. Larson, Long Beach, Calif., assignors, by mesne assignments, to McDonnell Douglas Corporation, Santa Monica, Calif., a corporation of Maryland
Filed Jan. 15, 1964, Ser. No. 337,768
21 Claims. (Cl. 204—143)

This invention relates to the chemical etching of a metal work piece, and is particularly concerned with procedure for rapidly and efficiently etching metal honeycomb, particularly stainless steel honeycomb core, employing semisolid gel etchants.

Cellular structures known as metallic honeycomb are extensively employed in the aircraft industry for production of aircraft wing sections and other parts of the aircraft. This generally requires the shaping or contouring of the honeycomb into the desired configuration for its required services. Due to the extreme difficulty of shaping these light-weight cellular structures by mechanical means without deforming or mutilating the honeycomb structure, chemical etching has been resorted to for shaping such structures accurately and without material deformation of the cellular structure.

However, the chemical etchants presently employed are in the form of a liquid etchant which requires (1) preparatory treatment of the metal surface, (2) masking of that portion of the surface not to be etched, (3) immersion of the masked metal part in the liquid etching solution in a tank of sufficient size and at an accurately controlled temperature and composition for a suitable period of time, and (4) the post-treatment of the metal part which includes removing residual etchant and stripping off the maskant material.

A particularly important aspect of the process of chemical etching of metallic honeycomb resides in the proper masking of those portions of the honeycomb core which are not to be etched, from attack by the chemical etchant, so as to confine the chemical etchant to those portions or areas of the core to be removed. According to a presently employed common mode of procedure, the liquid etchant is confined to those areas of the honeycomb core to be etched by the use of a maskant which is backed up or stabilized with a resinous material which is introduced into the cells of those portions of the core which are to be protected from chemical attack. Following etching, the backup or resinous fill material must be removed from the remaining honeycomb core, together with the adjacent maskant. It becomes especially difficult and time-consuming in many instances to remove such fill material following etching.

Also, when employing etching operations considerable equipment is often required in the form of hoists, heaters, pumps and plumbing for the liquid etching operation. Also, the waste disposal of liquid etchants is a problem in that present liquid waste cannot be drained to sewer lines. It must be disposed of in other ways.

It is an object of the invention to avoid liquid chemical etchants and employ in place thereof semisolid etchant materials, thus avoiding many of the above-noted disadvantages of liquid chemical etching.

Another object of the invention is the provision of a system and procedure for chemically etching metal honeycomb core without the necessity for masking, by utilizing semisolid etchants.

Another object of the invention is the provision of a system and process for chemically etching metal honeycomb core, particularly stainles steel honeycomb core, by means of semisolid acid etchants, as efficiently as by presently employed liquid etching.

The above and other objects of the invention will appear hereinafter.

It has been found that semisolid gels which are capable of holding in suspension an electrolyte, e.g., an aqueous acid solution, and which are sufficiently rigid to retain their shape when placed in contact with a surface to be etched, can be placed on a metal work piece, for example on one face of a metal honeycomb core, and the semisolid etchant will remove metal from the work piece or honeycomb core to form a reverse image of the contour or shape of the semisolid gel etchant in contact with such work piece or honeycomb. Such chemical etching operation can take place without requiring the masking of any portion of the honeycomb core being etched, but to insure against attack by the chemical etchant of any portions of the honeycomb core which are not desired to be etched, it is preferred to envelope the assembly, including hte semisolid gel in contact with the honeycomb core, in a dielectric medium as described in greater detail below, such as kerosene.

However, it has been determined that electrolytic gel etchants are less effective in etching or dissolving metals as compared to the effectivenes of liquid etchants containing a corresponding electrolyte, e.g., an aqueous acid solution. Gel etchants are further restricted by the slow migration of reaction products away from the metal work face and into the gel. Gaseous reaction products also restrict gel etchant performance and contribute to roughness of the resulting etched surfaces.

It has now been found that by applying a direct electrical current, preferably of low voltage, across the assembly of the gel and the honeycomb core work piece in a direction such that the honeycomb core is anodic, the etch rate of the gel on the honeycomb is greatly increased and reaction products resulting from the chemical attack of the gel on the honeycomb core metal are disposed of with greater facility. The etch rates thus attained are essentially comparable to or in excess of etch rates obtained employing liquid chemical etchants.

The highly acidic media required for etching steel alloys such as steel honeycomb core present problems in the preparation of stable acid-gel systems which retain a semirigid consistency and which are capable of removing metal by chemical action upon contact with a surface, particularly at ambient temperature. Cellulose acetate and carboxymethylcellulose have been found to be the most successful gelling agents for the semisolid acid gel etchants employed in the invention. Cellulose acetate requires considerably more time to gel, due to gradual hydrolysis, but it results in a firmer gel. These gels can be cast to a desired shape in a mold, and the cast gel slabs can be further readily trimmed to a desired profile. Other resins which can be employed in forming the acid-gel etchant include, for example, carboxy polymethylene resin, carboxyethylcellulose, and polyvinyl acetate. These latter materials, however, are not preferred. Cellulose acetate and carboxymethylcellulose have the important property of being able to form semisolid gels with highly concentrated acid solutions, and the higher the acid content of the gel, within certain limits as noted below, the greater the effectiveness of the gel in the etching process.

Various liquid etchants can be incorporated in the above-described gels. It has been found, for example, that both cellulose acetate and carboxymethylcellulose have the ability to gel a wide variety of liquid etchants of various acids and salts, individually or mixed, over a relatively wide range of concentrations. Thus, aqueous solutions can be employed for this purpose in the form of aqueous hydrochloric, hydrofluoric, nitric, phosphoric, sulfuric, and boric acids, and aqueous salt solutions such as nickel chloride, sodium sulfate, nickel sulfate, ammonium fluoride, and ferrous ammonium sulfate, can be employed. Also, mixtures of the above acids, or mixtures of such acids and salts can be employed. A particularly useful acid system which can be gelled by means of cellulose acetate or carboxymethylcellulose, and which is particularly effective for etching stainless steel honeycomb core, is a mixture of hydrochloric and nitric acids, and water.

The resin or gel agent used, e.g., cellulose acetate, the acid etchant, and water are blended and mixed by agitation, and after mixing, the formulation is poured into a mold, such as a plastic mold. Gelation can occur within a period of minutes or hours, e.g. 6 to 24 hours, or longer, depending on factors including the type of gelling agent and the amount thereof used, the type of acid employed and the concentration thereof. The mixing of the gel components and the gel casting operations are carried out at at substantially ambient temperatures.

It has been found that for etching honeycomb core formed from steel alloys, cellulose acetate or carboxymethylcellulose-acid gels having the following proportions of components are preferably employed:

| | |
|---|---|
| Cellulose acetate or carboxymethylcellulose _____grams__ | 24–36 |
| Hydrochloric acid (20° Bé.) _____ml__ | 12–96 |
| Nitric acid (30° Bé.) _____ml__ | 4–10 |
| Water _____ml__ | 70–100 |

In the above gels, nitric acid can be completely eliminated, with the effect, however, that there is a greater amount of insoluble reaction products formed at the gel-honeycomb interface during etching. Also, in the above gel formulations water can be partially or completely substituted by methyl or ethyl alcohol. The alcohol improves somewhat the diffusion characteristics of the reaction products into the gel. When carboxymethylcellulose is used in place of cellulose acetate, there is some sacrifice in gel rigidity.

If too little of the cellulose acetate or carboxymethylcellulose is used in the above formulations, the gel becomes mushy, and if an excessive amount of such gelling agent is employed, the gel sets up rapidly and tends to deteriorate, that is, crack in a short period of time.

The acid concentrations can range from 0.5 to 6.0 normal, and it has been found advantageous to maintain and use stock solutions of such acids for best results. The use of extremely high acid concentrations is detrimental in causing cracking and disintegration of the gel and in producing a mushy gel.

For the preferred cellulose acetate-acid gels, an increase in acid normality or concentration results in a more rapid gelation time. However, under these conditions the usable life of the gels is not nearly as long, and deterioration can take place in about seven days. If acid strength is decreased substantially, gelation time increases greatly. If the acid concentration is extremely low, then no gelation occurs. Thus, using acid normalities of 1.5 to 3 normal, gelation time is increased to about 3 to 7 days, whereas with the preferred 3 to 6 normal acids, gelation can be completed in about 24 hours. The above gelation time periods are based on gelation carried out at ambient temperatures. Increase in temperature will decrease gelation time.

In the case of carboxymethylcellulose-acid gels, gelation occurs to form a firm gel in a short time period generally within about 10 to about 20 minutes, and hence gelation occurs much more rapidly in this case than for the cellulose acetate-acid gels. The rate of carboxymethylcellulose gelation is essentially independent of acid concentration.

Following gelation, most of the gels, including cellulose acetate and carboxymethylcellulose, exhibit a phenomenon known as syneresis which is an exuding of small amounts of liquid accompanied by gel shringage. The shrinkage which accompanies syneresis is of concern because of the need to maintain accurate gel dimensions, especially for etching contoured surfaces. This instability problem is alleviated by allowing the gel to age for a period of time until syneresis substantially ceases, for example, for a period of approximately ten days in the case of cellulose acetate and carboxymethylcellulose-acid gels, before the gel is used. The amount of gel shrinkage is predictable and can be compensated for and proper allowance made in casting or trimming the gel to a desired profile, e.g., by using shrink-scale molds. Gel shrinkage can range from between 3% to about 15%, the shrinkage of cellulose acetate-acid-water gels being consistent and predictable within about 0.5%.

Aside from syneresis, the gels are stable for relatively long periods of time. Shrinkage can be controlled with a fair degree of uniformity by storing and aging the gels in closed containers until the syneresis is essentially complete. The acid gels should be stored in closed containers to reduce evaporation loss of acid volatiles and consequent shrinkage and warping. Storage at ambient conditions is adequate. Some gels can be stored for weeks and months and will remain stable. Thus, cellulose acetate-acid gels are stable for at least about three weeks or more.

The acid gel etchants employed in the invention process are effective for etching stainless steel, particularly the stainless steels employed for manufacturing honeycomb such as AM350, 17–7PH and PH15–7Mo. Other types of steel alloys such as 4130, 4340, 302 and 321 also can be etched. The acid etchants can also be used to etch nickel alloys, titanium, and refractory metals such as molybdenum, columbium and tantalum.

The invention system and process are described in greater detail below in connection with the accompanying drawings wherein.

Figure 1:
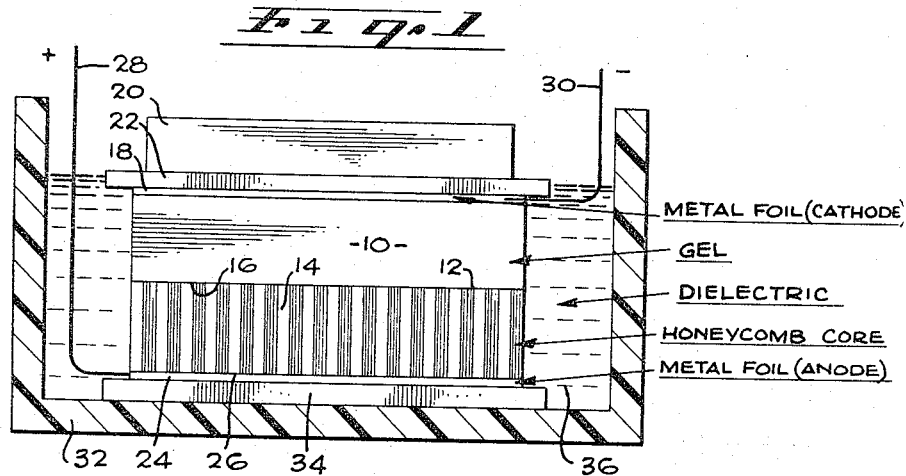
FIG. 1 represents a generally schematic assembly including the acid gel and the honeycomb core for carrying out the electro-chemical etching process of the invention.

Referring to FIG. 1 of the drawing, numeral 10 represents an acid gel of the type described above, having a semisolid, semirigid consistency. The gel has a flat lower surface, as indicated at 12, to produce a straight or flat etch of one face of a honeycomb core, represnted by numeral 14. The gel is placed on the upper surface 16 of the honeycomb core 14 as seen in FIG. 1, with just sufficient force to insure proper contact of the lower face 12 of the gel with the upper face 16 of the honeycomb core, without embedding the honeycomb in the gel.

An electrode 18, e.g., in the form of a copper or aluminum foil, and forming the cathode, is placed on the upper surface of the gel, and in preferred practice, a weight 20 is placed over electrode 18 and the acid gel 10, and insulated from the cathode 18 by a plastic sheet 22. Weights up to about ¼ pound per square inch can be employed.

While it is possible to operate without the weights, it is preferred to employ same in order to obtain intimate contact at the gel-honeycomb core interface so as to maintain electrical contact and also effective chemical reaction at such interface. An electrode 24, for example, copper or aluminum foil, and functioning as anode, is positioned to contact the lower face 26 of the honeycomb core. An electrical connection 28 connects the anode 24 to the positive pole of a source of direct current, such as a battery, and a second electrical connection 30 connects the cathode 18 with the negative pole of such electrical power source.

The entire assembly described above is placed in a container 32, e.g., composed of plastic, such assembly resting on a plastic sheet 34 at the bottom of the container.

A dielectric fluid medium, preferably kerosene, is placed in the container 32, to a height such that the acid gel 10, the honeycomb core 14 to be etched, and the anode 24 and cathode 18 are all completely submerged in the dielectric. Submerging the acid gel and the honeycomb core workpiece in a dielectric liquid such as kerosene prevents evaporation of acid volatiles and gel warpage. The dielectric liquid environment also prevents acid vapor attack on exposed cell walls, provides a heat exchange medium for better temperature control, and facilitates removal of reaction products. If desired, other dielectric fluids can be employed, e.g., any petroleum fraction having a high flash point and low vapor pressure, and which is immiscible and inert with respect to the components of the acid gel system.

The chemical etching operation which takes place is preferably carried out at about ambient temperature, although the temperature of etching may be varied. The chemical reaction which occurs at the interface between the acid gel and the adjacent face of the honeycomb core during the etching period results in removal of metal from the adjacent face of the anodic honeycomb core, such metal being dissolved in the gel and being dispersed in the acid gel etchant. Some of the metal salts so formed are dispersed in the dielectric medium. A mass diffusion of the reaction product stakes place through the acid gel in a direction away from the gel-honeycomb interface. This is often evidenced by a gradual change in coloration of the gel, starting at the interface and progressing through the gel, during the etching period. Reaction products also drop through the cells of the honeycomb core from the upper face of the honeycomb at which the reaction is occurring down to the bottom of the dielectric, with the soluble salts and other reaction products migrating through the gel as previously noted.

Applying a continuous direct current in series across the gel and an anodic honeycomb workpiece, according to the invention, greatly supplements the chemical energy available in the gel and substantially increases the etch rate and prevents gaseous polarization at the gel-metal interface. In the absence of the electrical current, gas polarization and polarization by accumulation of solid reaction products take place rapidly at the honeycomb core-gel interface, and in a short period of time greatly retard the etching rate. Although some polarization occurs at the gel-honeycomb interface after a direct current is applied, the application of direct current according to the invention in conjunction with the above gel etchants still increases the etch rate by some 10 to 25 times the rate employing gel etchants alone in the absence of such electrical current.

It has been found that only continuous direct current will produce the invention results. Thus, applying intermittent direct current or superimposing alternating current on the direct current provides substantially no improvement.

The voltage applied should not be excessive. For honeycomb core of a size of about 12″ x 12″ x 1″ in thickness, voltage should not be in excess of about 10 volts, preferably not in excess of about 5 volts. Hence, voltage can range from about ¼ volt up to about 10 volts, preferably from about ¼ volt to about 5 volts, depending on the resistance of the system. For a 9″ x 9″ steel honeycomb core, for example, voltage of about 2.5 volts has been found satisfactory. If the voltage is excessive, the reaction rate is increased to such an extent that an excessive buildup of gaseous and solid reaction products at the gel-honeycomb core interface occurs. Also, the voltage applied across a particular system should not be such as to exceed the current densities employed, as defined below. The current density employed depends on various factors such as size and type of honeycomb core, the nature of the acid gel etchant, temperature of etching, and other factors. Usually, current density utilized is not greater than about 0.25 amp. per square inch, e.g., ranging from about 0.01 to about 0.25 amp., preferably in the range of about 0.01 to about 0.15 amp. per square inch. However, where special measures are taken to prevent overheating at the gel-honeycomb interface, such as by cooling and circulation of the dielectric, current densities as high as about 0.5 amp. per square inch or more can be employed. Excessively high current density cracks the gel, causing loss of liquid etchant, while extremely low current density undesirably prolongs the etch period. The unit "per square inch" used in connection with the current density values is based on the total surface area of honeycomb face including the cell areas, adjacent to the acid gel etchant. In other words, the current densities are generally based on the total current used divided by the total face area of the honeycomb core being etched.

During the etching period, the acid gel is allowed to advance into the honeycomb core as metal is removed at the interface. This is aided by the presence of the weight 20, but as previously noted, the weight is not sufficiently great to cause the honeycomb to be embedded into the gel at any time during the etching period. This advancement of the gel into the honeycomb during the etching period is termed the "walk-in technique."

Etch rates of ½ mil up to about 1 mil per minute can be achieved, according to the invention, depending on the acid concentration and the current density employed. A depth of cut up to ½ inch or more can be obtained. Depth of cut can be controlled by employing a dial indicator or by timing the cutting operation according to the cutting rate, by any suitable means.

Flat facing cuts or etches by the procedure illustrated in FIG. 1 can be made in a honeycomb core with ±.001″ depth tolerance and maximum surface waviness of ±.001″ in 10 inches. Any remaining projections can be removed by hand honing. Honeycomb core can be faced by electrochemical etching according to the invention and brazed into panel assemblies which have etch compression strength equal to panels using conventionally processed or etched cores. Microscopic examination of the etched surfaces reveals no intergranular corrosion due to the acid attack.

It has been noted that the acid gels, even after many hours of use, appeared to be in excellent condition except for a very thin layer of reaction products on the surface in contact with the metal honeycomb core. It has also been noted that in some cases the honeycomb core has a thin film of reaction products adhering to the surface being etched. Hence, if desired, during the etching procedure, the current can be shut off, the gel separated from the honeycomb core, and the surfaces of the acid gel and honeycomb core washed with the dielectric liquid fluid to remove reaction products. After this washing period, the gel and the honeycomb core can be reassembled as illustrated in FIG. 1, and direct current applied to resume etching.

Figure 2:
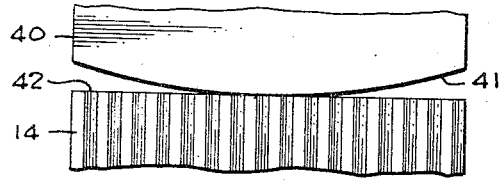
FIGS. 2 and 3 illustrate a modified type of gel contour or configuration for obtaining a corresponding reversed etched contour in one face of the honeycomb core.
Figure 3:
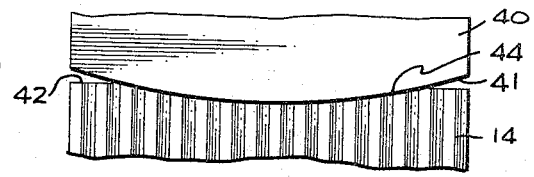

In FIGS. 2 and 3 there is illustrated the use of an acid gel etchant 40 having a curved lower surface 41 in contact with the honeycomb core 14, such that etching of the face 42 of the honeycomb according to the invention produces a corresponding curved etch pattern 44 in the honeycomb core, as seen in FIG. 3.

Figure 4:
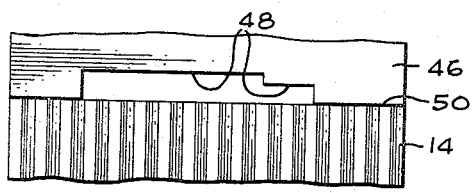
FIG. 4 illustrates another form of gel contour for obtaining a stepped etch configuration in the honeycomb core.

In FIG. 4 there is illustrated an acid gel 46 having a stepped configuration shown at 48 in the lower surface of the gel. A corresponding reversed stepped etch pattern will accordingly be formed in the adjacent face 50 of the honeycomb core 14 following etching.

The gel etchant configurations shown in FIGS. 2 and 4, and the etched honeycomb contour shown in FIG. 3 are exaggerated for purposes of illustration. It will be understood that gel etchants can be employed having any other desired shape or configuration. For some gel etchant contours different from those illustrated in the drawing, the arrangement shown in FIG. 1 may require modification to properly position and maintain the etchant in contact with the honeycomb core during the etching period.

Reaction products formed during the etching operation have little effect on the gel, other than discoloring the gel surface at the interface, so that the gel can be used repeatedly, one acid gel etchant being used for the etching of several honeycomb core sections.

The following are examples of practice of the invention:

*Example 1*

A gel is formed containing cellulose acetate and acid, according to the invention, in the proportions of 30.0 grams cellulose acetate, 20.0 ml. of 20° Bé. hydrochloric acid, 8.1 ml. of 30° Bé nitric acid, and 71.0 ml. of water. This mixture is blended with a propeller-type mixer.

After mixing, the formulation is poured into a plastic mold. Gelation occurs within about 24 hours at room temperature. Thickness of the gel casting so formed is about 1″. The resulting gel is aged for about 10 days until syneresis substantially ceases before the gel is used. As previously noted, the amount of shrinkage is predictable and can be compensated for. In this manner an acid gel of a semisolid rubbery consistency which retains its shape and is self-supporting, and which can be handled readily, is formed. Relatively large gel sections, e.g., up to about 12″ x 12″ x 1″, or greater, can be so produced.

A copper foil electrode is placed on one face of the acid gel etchant, and the resulting gel-cathode assembly is placed over a 9″ x 9″ section of 17–7PH stainless steel honeycomb core to be contoured, with the opposite face of the acid gel etchant in contact with the face of the honeycomb core to be contoured, with just sufficient force to insure proper contact between the gel and honeycomb. A copper foil anode is then placed in contact with the opposite face of the honeycomb core section. Proper electrical connections are made between the cathode and anode and a source of direct current potential. A weight of about ¼ pound per square inch of surface is placed over the cathode and insulated therefrom by means of a plastic sheet. The resulting assembly is then submerged in a bath of kerosene. The entire unit is now as shown in FIG. 1 of the drawing.

A potential of about 2.5 volts is applied across the gel-honeycomb core section assembly, making the honeycomb core in contact with electrode 24 anodic. The current applied is approximately 8 amps. and the resulting current density is approximately 0.1 amp. per square inch of honeycomb core. During etching, the gel advances toward and remains in contact with the honeycomb section as the metal is removed, aided in this respect by the presence of the weight, without embedding the honeycomb in the gel. An etch rate of between about 30 to 40 mils per hour is obtained. The current is shut off when the desired depth of etch is obtained, e.g., about ¼ inch.

The unit is then disassembled and the gel and etched honeycomb core section are removed from the dielectric bath.

*Example 2*

The process of Example 1 is essentially repeated, except that in place of the acid etchant of Example 1, an acid etchant produced by gelation of the following mixture having proportions of components noted below is employed.

| | | |
|---|---|---|
| Cellulose acetate | grams | 15 |
| Nitric acid (42° Bé.) | ml | 48 |
| Hydrofluoric acid (70%) | ml | 12 |
| Water | ml | 180 |

Also, in place of the stainless steel 17–7PH honeycomb core section employed in Example 1, a titanium honeycomb core section of substantially the same dimensions is etched.

The etch rate for etching the titanium honeycomb core in the instant example is also about 30 to about 40 mils per hour. An etch depth of about ¼ inch is obtained.

*Example 3*

The procedure of Example 1 is followed, except that the acid gel employed is formed from carboxymethylcellulose as gel agent or carrier in place of the cellulose acetate. Gelation occurs in about 10 to 15 minutes, and the gel is aged for about 10 to 12 days. During the aging period the gel is immersed in the aqueous acid solution of Example 1. The resulting acid gel has somewhat less rigidity than the cellulose acetate acid gel of Example 1. Etching results using such carboxymethylcellulose-acid gel on a 17–7PH stainless steel honeycomb core section similar to the results of Example 1, are obtained.

*Example 4*

The procedure of Example 1 is substantially followed, except that the electrodes are omitted, and no electrical current is employed.

By this procedure, employing solely the acid gel in contact with the honeycomb core, the average rate of etching is only of the order of about 2 mils per hour, and it is noted that etching rate decreases during the etching period.

It is accordingly seen by comparison of Examples 1 and 4 that the use of continuous direct current in conjunction with the employment of a semirigid acid gel for etching honeycomb core greatly increases rate of etching and permits the etching action to proceed relatively rapidly over a prolonged period of time by facilitating removal of reaction products from the gel-honeycomb interface, as compared to the relatively slow rate of etch and the rapid slowing up of the action in the absence of the application of direct current according to the invention.

From the foregoing, it is seen that the invention provides an improved technique and process employing semisolid electrolytic gel etchants for etching metal workpieces, particularly honeycomb core, to a desired configuration or contour in a short period of time comparable or superior to etch rates obtained in conventional liquid chemical etching, and avoiding the disadvantages of the use of liquid etchants. Further, the procedures, facilities and tooling required for electrochemical etching of honeycomb core according to the invention are relatively simple, and the materials employed are relatively inexpensive, and the electric power consumption is of minor economic consideration.

Although the invention principles are particularly advantageous for etching metal honeycomb core, such principles can be applied also for the etching of other forms of metal workpieces.

While we have described particular embodiments of our invention for the purpose of illustration, it should be understood that various modifications and adaptations thereof may be made within the spirit of the invention, as set forth in the appended claims.

We claim:

1. A process for etching a metal workpiece, which comprises passing a direct electrical current through an electrolytic gel etchant in contact with a metal workpiece, said gel containing an etchant capable of attacking said metal workpiece and removing metal therefrom, said gel having a semisolid consistency and being sufficiently firm to retain its shape while in contact with said workpiece, said gel selected from the group consisting of carboxypolyalkylene resin, carboxyalkyl cellulose, and polyvinyl alkanoate, said etchant selected from the group consisting of acids and nonhydrolyzable salts, said etchant being compatible with said gel, said workpiece being connected as the anode in the electrical circuit, and etching said workpiece to a predetermined depth of etch.

2. A process for etching metal honeycomb which comprises passing a direct electrical current through an electrolytic gel etchant in contact with a face of a metal honeycomb core, said gel containing an etchant capable of attacking said metal honeycomb and removing metal therefrom, said gel having a semisolid consistency and being sufficiently firm to retain its shape while in contact with said honeycomb core, said gel selected from the group consisting of carboxypolyalkylene resin, carboxyalkyl cellulose, and polyvinyl alkanoate, said etchant selected from the group consisting of acids and nonhydrolyzable salts, said etchant being compatible with said gel, said honeycomb core being connected as the anode in the electrical circuit, and etching said honeycomb core to a predetermined depth of etch while substantially removing reaction products from the honeycomb core-gel interface.

3. A process for etching metal honeycomb which comprises passing a direct electrical current through an electrolytic gel in contact with a face of a metal honeycomb core, said gel containing an etchant capable of attacking said metal honeycomb and removing metal therefrom, said gel having a semisolid consistency and being sufficiently firm to retain its shape while in contact with said honeycomb core, said gel selected from the group consisting of carboxypolyalkylene resin, carboxyalkyl cellulose, and polyvinyl alkanoate, said etchant selected from the group consisting of acids and nonhydrolyzable salts, said etchant being compatible with said gel, said honeycomb core being connected as the anode in the electrical circuit, said gel and said honeycomb core being enveloped in a dielectric fluid, and etching said honeycomb core to a predetermined depth of etch while substantially removing reaction products from the honeycomb core-gel interface.

4. A process for etching metal honeycomb, which comprises placing an electrolytic gel etchant in contact with a metal honeycomb core, said gel containing an etchant capable of attacking said metal honeycomb and removing metal therefrom, said gel being substantially in the form of a sheet with one face thereof in contact with the one face of said honeycomb core, said gel having a semisolid consistency and being sufficiently firm to retain its shape while in contact with said honeycomb core, said gel selected from the group consisting of carboxypolyalkylene resin, carboxyalkyl cellulose, and polyvinyl alkanoate, said etchant selected from the group consisting of acids and nonhydrolyzable salts, said etchant being compatible with said gel, enveloping raid honeycomb core and said gel in a dielectric fluid medium, passing a direct electrical current through said gel and said honeycomb core in contact with said gel, said honeycomb core being connected as the anode in the electrical circuit, and continuing passage of said direct current for a period of time sufficient to etch said honeycomb core to a predetermined depth while substantially removing reaction products from the honeycomb core-gel interface.

5. A process for etching metal honeycomb, which comprises placing a gel etchant in contact with a metal honeycomb core, said gel containing an etchant capable of attacking said metal honeycomb and removing metal therefrom, said gel being substantially in the form of a sheet with one face thereof in contact with one face of said honeycomb core, said gel having a semisolid consistency and being sufficiently firm to retain its shape while in contact with said honeycomb core, said gel selected from the group consisting of carboxypolyalkylene resin, carboxyalkyl cellulose, and polyvinyl alkanoate, said etchant selected from the group consisting of acids and nonhydrolyzable salts, said etchant being compatible with said gel, enveloping said honeycomb core and said gel in a dielectric fluid medium, passing a direct electrical current through said gel and said honeycomb core in contact with said gel, said honeycomb core being connected as the anode in the electrical current, and continuing passage of said direct current for a period of time sufficient to etch said honeycomb core to a predetermined depth, at a voltage permitting substantial removal of reaction products from the honeycomb core-gel interface, the etched face of said honeycomb core having a contour corresponding to the adjacent face of said gel.

6. A process for etching a metal workpiece, which comprises placing a first electrode in contact with one face of a gel etchant substantially in the form of a sheet, said gel containing an etchant capable of attacking said metal honeycomb and removing metal therefrom; placing said electrode-gel assembly in contact with a metal workpiece, with the other face of said gel etchant in contact with one face of said workpiece, said gel having a semisolid consistency and being sufficiently firm to retain its shape while in contact with said workpiece, said gel selected from the group consisting of carboxypolyalkylene resin, carboxyalkyl cellulose, and polyvinyl alkanoate, said etchant selected from the group consisting of acids and nonhydrolyzable salts, said etchant being compatible with said gel, placing a second electrode in contact with the opposite face of said workpiece, submerging the entire assembly in a dielectric fluid medium, applying a direct current potential to said assembly with said first electrode as cathode and said second electrode as anode, and passing a direct electrical current through said assembly for a period of time sufficient to etch the face of said workpiece in contact with said gel etchant to a predetermined depth at a voltage permitting substantial removal of reaction products from the metal workpiece-gel interface.

7. A process for etching metal honeycomb, which comprises placing a first electrode on one face of an acid gel etchant substantially in the form of a sheet, said gel etchant being composed of a carrier selected from the group consisting of a cellulose acetate and a carboxymethyl cellulose carrier, said carrier having dispersed therein an acid etchant capable of attacking said metal honeycomb and removing metal therefrom, said acid etchant being compatible wtih said gel carrier placing said electrode-gel assembly over a metal honeycomb core with the other lower face of said acid gel etchant in contact with the upper face of said honeycomb core, substantially without embedding said honeycomb core in said gel, said gel having a semisolid consistency and being sufficiently firm to retain its shape while in contact with said honeycomb core, placing a second electrode in contact with the lower face of said honeycomb core, submerging the entire assembly in a dielectric fluid medium, applying a direct current potential to said assembly with said first electrode as cathode and said second electrode as anode, and passing a direct electrical current through said assembly for a period of time sufficient to etch the upper face of said honeycomb core in contact with said gel etchant to a predetermined depth, at a voltage in the range from about ¼ volt up to about 10 volts, the etched face of said honeycomb core having a contour corresponding to the adjacent face of said acid gel.

8. A process as defined in claim 7, said current density not exceeding about 0.5 amp. per square inch.

9. A process for etching metal honeycomb, which comprises placing an acid gel over a stainless steel honeycomb core, said acid gel being composed of a cellulose acetate carrier having dispersed therein an electrolyte in the form of an aqueous solution containing hydrochloric acid, the lower face of said gel being in contact with the upper face of said honeycomb core, said gel having a semisolid consistency and being sufficiently firm to retain its shape while in contact wtih said honeycomb core, enveloping said honeycomb core and acid gel in a dielectric fluid medium composed essentially of kerosene, applying a direct current potential to said gel-honeycomb core assembly in a direction such as to make said honeycomb core anodic, and passing a direct electrical current through said assembly for a period of time sufficient to etch the upper face of said honeycomb core in contact with said gel etchant to a predetermined depth, at a voltage permitting substantial removal of reaction products from the honeycomb core-gel interface, the etched face of said honeycomb core having a contour corresponding to the adjacent face of said acid gel.

10. A process for etching metal honeycomb, which comprises placing an acid gel over a stainless steel honeycomb core, said acid gel being composed of a carboxymethylcellulose carrier having dispersed therein an electrolyte in the form of an aqueous solution containing hydrochloric acid, the lower face of said gel being in contact with the upper face of said honeycomb core, said gel having a semisolid consistency and being sufficiently firm to retain its shape while in contact with said honeycomb core, enveloping said honeycomb core and acid gel in a dielectric fluid medium composed essentially of kerosene, applying a direct current potential to said gel-honeycomb core assembly in a direction such as to make said honeycomb core anodic, and passing a direct electrical current through said assembly for a period of time sufficient to etch the upper face of said honeycomb core in contact with said gel etchant to a predetermined depth, at a voltage permitting substantial removal of reaction products from the honeycomb core-gel interface, the etched face of said honeycomb core having a contour corresponding to the adjacent face of said acid gel.

11. A process for etching metal honeycomb, which comprises placing an acid gel over a stainless steel honeycomb core, said acid gel being composed of a cellulose acetate carrier having dispersed therein an electrolyte consisting essentially of an aqueous solution of a mixture of hydrochloric and nitric acids, said acid gel being in the form of a sheet with the lower face thereof in contact with the upper face of said honeycomb core, said gel having a semisolid consistency and being sufficiently firm to retain its shape while in contact with said honeycomb core, enveloping said honeycomb core and acid gel in a dielectric fluid medium, applying a direct current potential to said gel-honeycomb core assembly in a direction such as to make said honeycomb core anodic, and passing a direct electrical current through said assembly for a period of time sufficient to etch the upper face of said honeycomb core in contact with said gel etchant to a predetermined depth, at a voltage in the range from about ¼ volt up to about 10 volts, the etched face of said honeycomb core having a contour corresponding to the adjacent face of said acid gel.

12. A process for etching metal honeycomb, which comprises placing an acid gel over a metal honeycomb core, said acid gel being composed of a cellulose acetate carrier having dispersed therein an electrolyte containing an aqueous solution of an acid capable of attacking said metal honeycomb and removing metal therefrom, said acid being compatible with said gel carrier, the lower face of said gel being in contact with the upper face of said honeycomb core, said gel having a semisolid consistency and being sufficiently firm to retain its shape while in contact with said honeycomb core, enveloping said honeycomb core and said gel in a dielectric fluid medium, applying a direct current potential to said gel-honeycomb core assembly in a direction such as to make said honeycomb core anodic, and passing a direct electrical current through said assembly, said potential being not substantially in excess of about 10 volts, and at a current density up to about 0.5 amp. per square inch, and permitting said gel to advance toward and remain in contact with said honeycomb core as metal is removed therefrom, to etch the upper face of said honeycomb core to a predetermined depth.

13. A process for etching metal honeycomb, which comprises placing an acid gel over a stainless steel honeycomb core, said acid gel being composed of a cellulose acetate gel carrier having dispersed therein an electrolyte consisting essentially of an aqueous solution of a mixture of hydrochloric and nitric acids, said acid gel being substantially in the form of a sheet with the lower face thereof in contact with the upper face of said honeycomb core, said gel having a semisolid consistency and being sufficiently firm to retain its shape while in contact with said honeycomb core, immersing said assembly in kerosene, applying a direct current potential to said gel-honeycomb core assembly in a direction such as to make said honeycomb core anodic, and passing a direct electrical current through said assembly, said potential being not substantially in excess of about 5 volts, and at a current density not in excess of about 0.25 amp. per square inch, and permitting said gel to advance toward and remain in contact with said honeycomb core as metal is removed therefrom, to etch the upper face of said honeycomb core to a predetermined depth.

14. A process for etching metal honeycomb, which comprises placing an acid gel over a stainless steel honeycomb core, said acid gel being composed of a carboxymethylcellulose gel carrier having dispersed therein an electrolyte consisting essentially of an aqueous solution of a mixture of hydrochloric and nitric acids, said acid gel being substantially in the form of a sheet with the lower face thereof in contact with the upper face of said honeycomb core, said gel having a semisolid consistency and being sufficiently firm to retain its shape while in contact with said honeycomb core, immersing said assembly in kerosene, applying a direct current potential to said gel-honeycomb core assembly in a direction such as to make said honeycomb core anodic, and passing a direct electrical current through said assembly, said potential being not substantially in excess of about 5 volts, and at a current density not in excess of about 0.25 amp. per square inch, and permitting said gel to advance toward and remain in contact with said honeycomb core as metal is removed therefrom, to etch the upper face of said honeycomb core to a predetermined depth.

15. A process for etching metal honeycomb, which comprises placing an acid gel over a titanium honeycomb core, said acid gel being composed of a carboxymethylcellulose gel carrier having dispersed therein an electrolyte consisting essentially of an aqueous solution of a mixture of nitric and hydrofluoric acids, said acid gel being substantially in the form of a sheet with the lower face thereof in contact with the upper face of said honeycomb core, said gel having a semisolid consistency and being sufficiently firm to retain its shape while in contact with said honeycomb core, immersing said assembly in kerosene, applying a direct current potential to said gel-honeycomb core assembly in a direction such as to make said honeycomb core anodic, and passing a direct electrical current through said assembly, said potential being not substantially in excess of about 10 volts, and a current density up to about 0.5 amp. per square inch, and permitting said gel to advance toward and remain in contact with said honeycomb core as metal is removed therefrom, to etch the upper face of said honeycomb core to a predetermined depth.

16. A process for etching metal honeycomb, which comprises placing an acid gel over a stainless steel honeycomb core, said acid gel being composed of a cellulose acetate gel carrier having dispersed therein an electrolyte consisting essentially of an aqueous solution of a mixture of hydrochloric and nitric acids, said acid gel being substantially in the form of a sheet with the lower face thereof in contact with the upper face of said honeycomb core, said gel having a semisolid consistency and being sufficiently firm to retain its shape while in contact with said honeycomb core, placing a first electrode on the upper face of said acid gel, placing a weight on said first electrode, placing a second electrode in contact with the lower face of said honeycomb core, submerging the entire assembly in kerosene, applying a direct current potential to said assembly with said first electrode as cathode and said second electrode as anode, and passing a direct electrical current through said assembly, said potential being in the range from about ¼ volt to about 5 volts, and the current density being in the range from about 0.01 to about 0.15 amp. per square inch, and permitting said gel to advance toward and remain in contact with said honeycomb core as metal is removed therefrom, to etch the upper face of said honeycomb core to a predetermined depth.

17. A process for etching an apertured workpiece, which comprises passing a direct electrical current through an electrolytic gel etchant in contact with an apertured workpiece, said gel containing an etchant capable of attaching said workpiece, said gel having a semisolid consistency and being sufficiently firm to retain its shape while in contact with said workpiece, said gel selected from the group consisting of carboxypolalkylene resin, carboxyalkyl cellulose, and polyvinyl alkanoate, said etchant selected from the group consisting of acids and non-hydrolyzable salts, said etchant being compatible with said gel, said workpiece being connected as the anode in the electrical circuit, and etching said workpiece to a predetermined depth of etch while substantially removing reaction products from the workpiece-gel interface.

18. A process as defined in claim 17, wherein the voltage is not in excess of about 10 volts, employing a current density up to about 0.5 amp. per square inch.

19. A process as defined in claim 18, wherein said apertured workpiece is a metal honeycomb and said etchant is an acid etchant.

20. A process for etching metal honeycomb, which comprises placing an acid gel over a stainless steel honeycomb core, said acid gel being composed of a cellulose acetate carrier having dispersed therein an electrolyte in the form of an aqueous solution containing hydrochloric acid, the lower face of said gel being in contact with the upper face of said honeycomb core, said gel having a semisolid consistency and being sufficiently firm to retain its shape while in contact with said honeycomb core, applying a direct current potential to said gel-honeycomb core assembly in a direction such as to make said honeycomb core anodic, and passing a direct electrical current through said assembly for a period of time sufficient to etch the upper face of said honeycomb core in contact with said gel etchant to a predetermined depth, said potential being not substantially in excess of about 10 volts, and at a current density up to about 0.5 amp. per square inch, the etched face of said honeycomb core having a contour corresponding to the adjacent face of said acid gel.

21. A process as defined in claim 1, said etchant being an aqueous solution of an acid selected from the group consisting of hydrochloric, hydrofluoric, nitric, phosphoric, sulfuric, and boric acids.

References Cited
UNITED STATES PATENTS

| | | | |
|---|---|---|---|
| 607,484 | 7/1898 | Reider | 204—224 |
| 2,042,917 | 6/1936 | Von Brandt | 252—315 |
| 2,605,228 | 7/1952 | Alexander et al. | 252—315 |
| 2,792,329 | 5/1957 | Woodard | 252—315 |
| 3,024,167 | 3/1962 | Damaskus | 252—315 |
| 3,064,345 | 11/1962 | Herman et al. | |
| 3,116,170 | 12/1963 | Williams et al. | 136—86 |
| 3,137,622 | 6/1964 | Mueller et al. | 252—315 |
| 3,149,985 | 9/1964 | Gandon | 252—315 |
| 3,208,923 | 9/1965 | Feiner et al. | 204—143 |

FOREIGN PATENTS 844,584  8/1960  Great Britain.

JOHN H. MACK, *Primary Examiner.*

R. K. MIHALEK, *Assistant Examiner.*